US010047928B2

(12) United States Patent
Chen

(10) Patent No.: US 10,047,928 B2
(45) Date of Patent: Aug. 14, 2018

(54) LED HIGHLIGHT DECORATIVE BULB

(71) Applicant: Dongguan City Minleon Electronics Co., Ltd., Dongguan, Guangdong (CN)

(72) Inventor: Dongchang Chen, Dongguan (CN)

(73) Assignee: DONGGUAN CITY MINLEON ELECTRONICS CO., LTD., Guangdon (CN)

( * ) Notice: Subject to any disclaimer, the term of this patent is extended or adjusted under 35 U.S.C. 154(b) by 0 days.

(21) Appl. No.: 15/370,002

(22) Filed: Dec. 6, 2016

(65) Prior Publication Data

US 2018/0128447 A1 May 10, 2018

(30) Foreign Application Priority Data

Nov. 10, 2016 (CN) .................... 2016 2 1214034 U

(51) Int. Cl.
*F21V 3/00* (2015.01)
*F21V 17/12* (2006.01)
*F21V 31/00* (2006.01)
*F21V 17/16* (2006.01)
*F21K 9/232* (2016.01)
*F21K 9/238* (2016.01)
(Continued)

(52) U.S. Cl.
CPC ............... *F21V 3/00* (2013.01); *F21K 9/232* (2016.08); *F21K 9/237* (2016.08); *F21K 9/238* (2016.08); *F21V 17/12* (2013.01); *F21V 17/16* (2013.01); *F21V 31/005* (2013.01); *G02B 6/0001* (2013.01); *F21Y 2115/10* (2016.08)

(58) Field of Classification Search
CPC .......... F21V 3/00; F21V 31/005; F21V 17/12; F21K 9/235; F21K 9/237; F21Y 2115/10
See application file for complete search history.

(56) References Cited

U.S. PATENT DOCUMENTS 7,111,972 B2 * 9/2006 Coushaine ............... F21K 9/00
362/240
8,421,376 B2 * 4/2013 Jonsson ................. F21V 23/04
315/297

(Continued)

FOREIGN PATENT DOCUMENTS

JP    2014182995    9/2014

OTHER PUBLICATIONS

"Office Action of Canada Counterpart Application", dated Sep. 27, 2017, p. 1-p. 5.

*Primary Examiner* — Peggy Neils
(74) *Attorney, Agent, or Firm* — JCIPRNET

(57) ABSTRACT

The invention discloses an LED highlight decorative bulb, comprising a lamp shade capable of being mutually assembled by splicing, a light guide column located in the lamp shade, a flat circuit board arranged in a bottom of the light guide column, a patch LED lighting object arranged in the flat circuit board, and a bulb connecting seat arranged in the bottom of the light guide column, wherein an upper portion of the light guide column is in a shape of solid cone, a bottom surface of the flat circuit board is electrically connected with a conductive pin, the conductive pin is electrically connected with a vertical circuit board, the vertical circuit board is electrically connected with two electrodes in an inner wall of the bulb connecting seat through a guide line respectively, and the vertical circuit board is electrically connected with an LED driver chip and a resistor element.

6 Claims, 4 Drawing Sheets

(51) Int. Cl.
    *F21K 9/237*     (2016.01)
    *F21V 8/00*     (2006.01)
    *F21Y 115/10*     (2016.01)

(56) References Cited

U.S. PATENT DOCUMENTS

| | | | |
|---|---|---|---|
| 9,677,738 B2 * | 6/2017 | Sun | F21V 5/04 |
| 9,759,389 B2 * | 9/2017 | Bergmann | F21K 9/23 |
| 2013/0083555 A1 * | 4/2013 | Chen | G02B 6/0003 |
| | | | 362/555 |
| 2013/0279149 A1 * | 10/2013 | Udatsu | F21V 7/0091 |
| | | | 362/84 |
| 2017/0336063 A1 * | 11/2017 | Leung | F21V 31/005 |

\* cited by examiner

LED HIGHLIGHT DECORATIVE BULB

FIELD OF THE INVENTION

The invention relates to an illuminating device, and more particularly, to an LED highlight decorative bulb.

BACKGROUND OF THE INVENTION

For most of the existing LED bulbs, an LED lighting object is directly installed in a lamp shade, the light from the LED lighting object is directly emitted to the lamp shade, and then lights outwards. In this way, the light emitted from the LED lighting object is not mixed and scattered, so that the emitting quantity of the light will be limited, and the light uniformity is not very good. For the rest of the LED bulb, a flat light guide plate is arranged at the top of the LED lighting object for scattering the light. However, with respect to the spherical LED bulb through the flat light guide plate, the mixed and scattered light extracting rate is still limited, so as not to light out of the bulb well. Therefore, it is necessary to develop a new LED highlight decorative bulb to overcome these above deficiencies.

SUMMARY OF THE INVENTION

In order to overcome the deficiencies of the prior art, the invention aims at providing an LED highlight decorative bulb having a better light extracting effect, a higher mixed and scattered light extracting rate, more uniform light extracting, higher light lumen and higher brightness.

In order to solve the technical problems, the invention adopts a technical solution as follows: an LED highlight decorative lamp comprises a lamp shade capable of being mutually assembled by splicing, a light guide column located in the lamp shade, a flat circuit board arranged in a bottom of the light guide column, a patch LED lighting object arranged in the flat circuit board, and a bulb connecting seat arranged in the bottom of the light guide column, wherein an upper portion of the light guide column is in a shape of solid cone, a bottom surface of the flat circuit board is electrically connected with a conductive pin, the conductive pin is electrically connected with a vertical circuit board, the vertical circuit board is electrically connected with two electrodes in an inner wall of the bulb connecting seat through a guide line respectively, and the vertical circuit board is electrically connected with an LED driver chip and a resistor element.

Preferably, the bottom of the light guide column is equipped with a fixed ring, the bottom of the lamp shade is equipped with an external thread, an engagement portion of an upward side of the external thread and the lamp shade is equipped with a lamp shade waterproof groove; a waterproof rubber gasket is arranged in the lamp shade waterproof groove, the bulb connecting seat is threaded with the external thread of the bottom of the lamp shade, and the fixed ring of the light guide column is clamped and tightened between the bulb connecting seat and the bottom of the lamp shade.

Preferably, the bottom of the light guide column is equipped with an external thread connecting seat, the external thread connecting seat is equipped with an adhesion fixed station for connecting with the lamp shade, an engagement portion of the external thread connecting seat and the adhesion fixed station is equipped with a fixed station waterproof groove, the fixed station waterproof groove is internally equipped with the waterproof rubber ring, the lamp shade is fixedly connected with the adhesion fixed station through mucilage glue, and the external thread connecting seat is threaded with the bulb connecting seat.

Preferably, the flat circuit board is arranged in a flat circuit board fixed ring, and the flat circuit board fixed ring is clamped, tightened and fixed at an inner side of the bottom of the light guide column or an inner side of the bulb connecting seat.

Preferably, the adhesion fixed station is a hollow hemispherical station, the lamp shade is a shade body matched with the hollow hemispherical station, and the shade body is fixedly connected with the hollow hemispherical station through the mucilage glue.

Preferably, the bulb connecting seat is a screwed type bulb connecting seat or a bayonet type bulb connecting seat.

The invention has the advantageous effects as follows: the LED highlight decorative bulb comprises a lamp shade capable of being mutually assembled by splicing, a light guide column located in the lamp shade, a flat circuit board arranged in a bottom of the light guide column, a patch LED lighting object arranged in the flat circuit board, and a bulb connecting seat arranged in the bottom of the light guide column, wherein an upper portion of the light guide column is in a shape of solid cone, the light emitted by the patch LED lighting object of the LED highlight decorative bulb is mixed and scattered through the light guide column in the shape of the solid cone, and then is emitted out of the lamp shade, so that the LED highlight decorative bulb has a better light extracting effect, a higher mixed and scattered light extracting rate, more uniform light extracting, higher light lumen, and higher brightness.

BRIEF DESCRIPTION OF THE DRAWINGS

The invention will be further described in details with reference to the drawings and the implementation manner hereinafter.

DETAILED DESCRIPTION OF THE PREFERRED EMBODIMENTS

Figure 1:
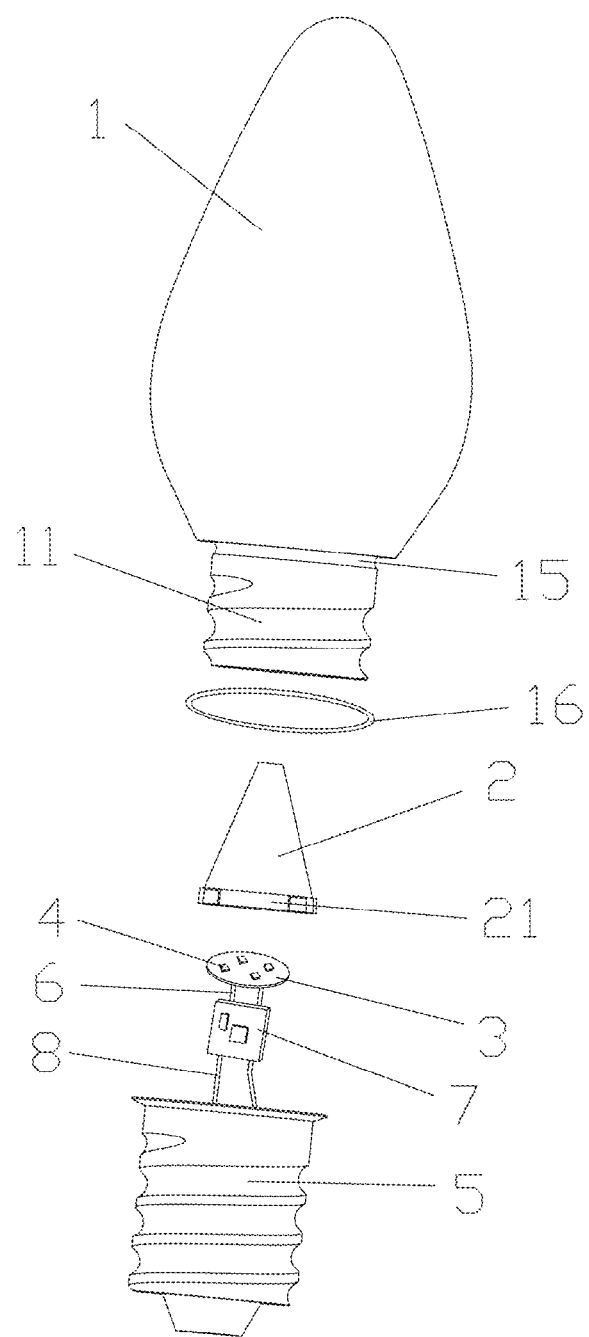
FIG. 1 is a structural breakdown schematic diagram of a first embodiment of the invention.

Referring to FIG. 1 to FIG. 4, an LED highlight decorative bulb comprises a lamp shade 1 capable of being mutually assembled by splicing, a light guide column 2 located in the lamp shade, a flat circuit board 3 arranged in a bottom of the light guide column, a patch LED lighting object 4 arranged in the flat circuit board, and a bulb connecting seat 5 arranged in the bottom of the light guide column, wherein an upper portion of the light guide column is in a shape of solid cone, a bottom surface of the flat circuit board is electrically connected with a conductive pin 6, the conductive pin is produced by automatic pin type welding connection of an automatic slice inserting machine, with a fast assembly speed and a high production rate, the conductive pin is electrically connected with a vertical circuit board 7, the vertical circuit board is electrically connected with two electrodes in an inner wall of the bulb connecting seat through a guide line 8 respectively, and the vertical circuit board is electrically connected with an LED driver chip, a resistor element and other electronic elements, the LED driver chip is a common LED control IC chip, and the chip refers to a public technology, so that its detailed description thereof will thus be omitted. As the upper portion of the light guide column is in a shape of solid shape, the light emitted by the patch LED lighting object 4 may be mixed and scattered; at the same time, the patch LED lighting object is adopted, a lighting direction faces upward entirely, which is more beneficial to light mixing and scattering of the light guide column, so that the LED highlight decorative bulb has a better light extracting effect, a higher mixed and scattered light extracting rate, more uniform light extracting, higher light lumen, and higher brightness.

A first embodiment of the invention refers to FIG. 1. The bottom of the light guide column is equipped with a fixed ring 21, the bottom of the lamp shade is equipped with an external thread 11, an engagement portion of an upward side of the external thread and the lamp shade is equipped with a lamp shade waterproof groove 15; a waterproof rubber gasket 16 is arranged in the lamp shade waterproof groove, the bulb connecting seat is threaded with the external thread of the bottom of the lamp shade, and the fixed ring 21 of the light guide column is clamped and tightened between the bulb connecting seat and the bottom of the lamp shade. Such structure may make the lower portion structure of the light guide column smaller to save material, and is applicable to a structure of a small-sized bulb. After assembly in this embodiment, the bulb connecting seat presses against the waterproof rubber gasket 16 and the lamp shade waterproof groove 15 in the engagement portion of the lamp shade, so as to achieve a waterproof effect.

Figure 2:
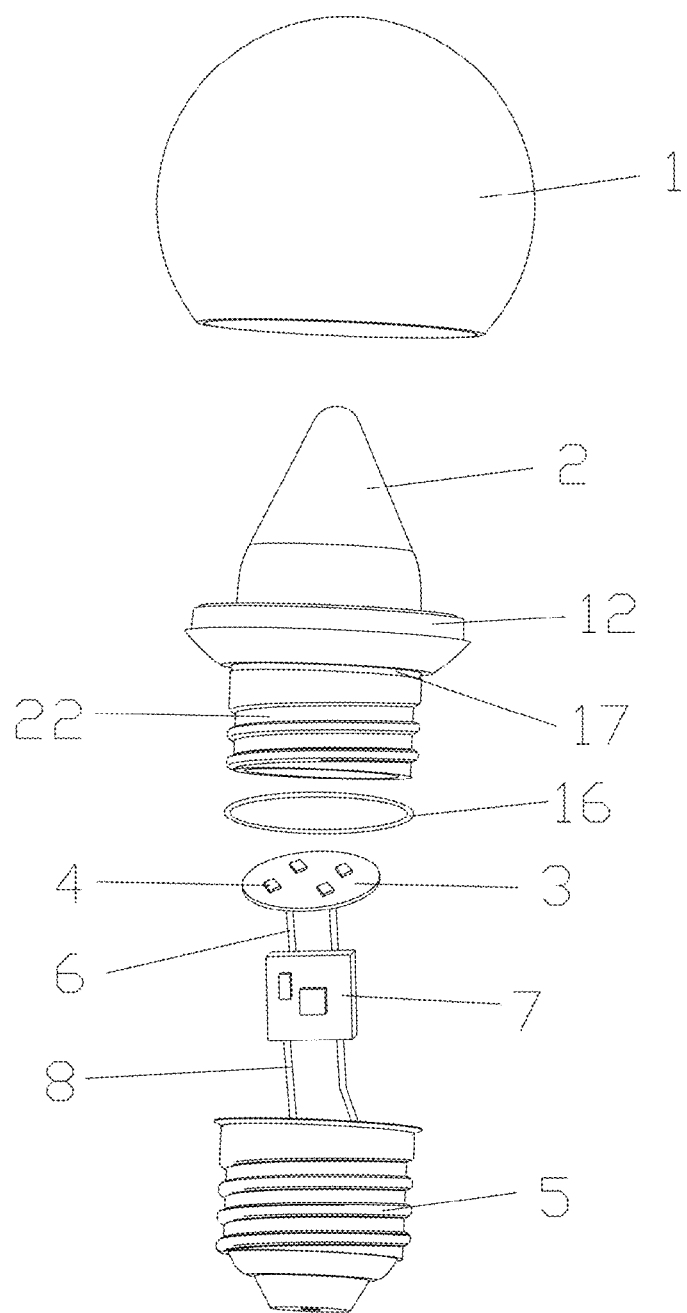
FIG. 2 is a structural breakdown schematic diagram of a second embodiment of the invention.

A second embodiment of the invention refers to FIG. 2, the bottom of the light guide column is equipped with an external thread connecting seat 22, the external thread connecting seat is equipped with an adhesion fixed station 12 for connecting with the lamp shade, an engagement portion of the external thread connecting seat and the adhesion fixed station is equipped with a fixed station waterproof groove 17, the fixed station waterproof groove is internally equipped with the waterproof rubber ring 16, the lamp shade is fixedly connected with the adhesion fixed station through mucilage glue, and the external thread connecting seat is threaded with the bulb connecting seat. Such structural light guide column may be combined with the lamp shades in different shapes. The assembly may be convenient, so that the cost is saved. After assembly in this embodiment, the bulb connecting seat presses against the waterproof rubber gasket 16 and the fixed station waterproof groove 15 in the engagement portion of the fixed station, so as to achieve the waterproof effect.

Figure 3:
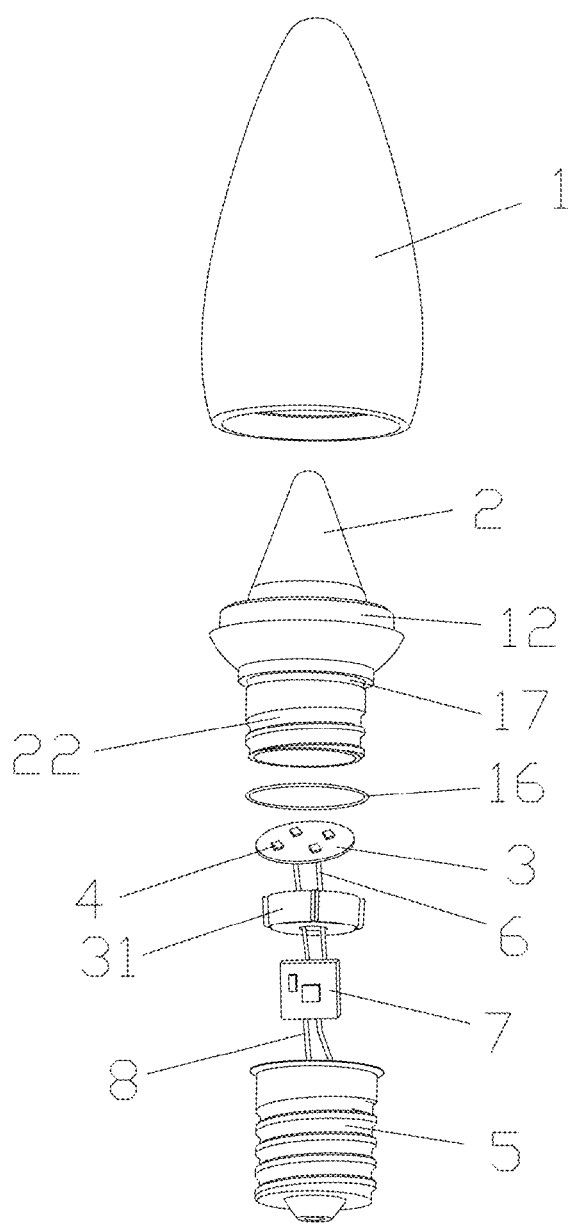
FIG. 3 is a structural breakdown schematic diagram of a third embodiment of the invention.

A third embodiment of the invention refers to FIG. 3. On the basis of the second embodiment, the flat circuit board is arranged in a flat circuit board fixed ring 31, and the flat circuit board fixed ring is clamped, tightened and fixed at an inner side of the bottom of the light guide column or an inner side of the bulb connecting seat. The flat circuit board fixed ring may stabilize the flat circuit board, so that it is more stable and has better quality.

Figure 4:
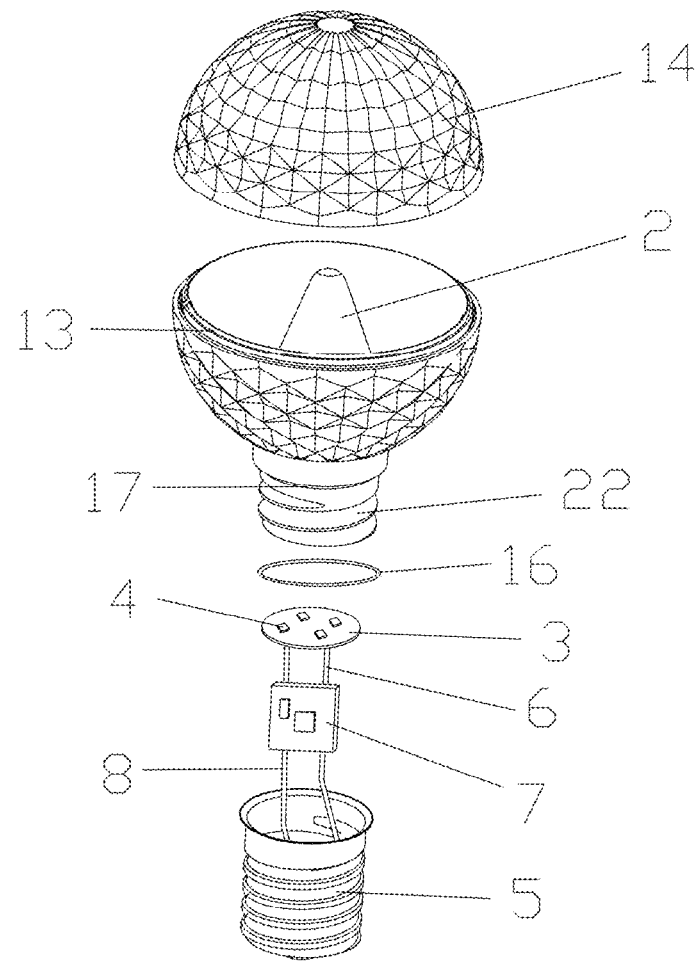
FIG. 4 is a structural breakdown schematic diagram of a fourth embodiment of the invention.

A fourth embodiment of the invention refers to FIG. 4. On the basis of the second embodiment, the adhesion fixed station is a hollow hemispherical station 13, the lamp shade is a shade body 14 matched with the hollow hemispherical station, and the shade body is fixedly connected with the hollow hemispherical station through the mucilage glue. Such structure may increase the optional types of the lamp shade bodies, so that it is convenient to combine and has diversified forms.

The bulb connecting seat of the invention may be a screwed type bulb connecting seat or a bayonet type bulb connecting seat (without illustrated in figures). FIG. 1 to FIG. 4 refer to the screwed type bulb connecting seat, which may be applicable to installing different lamp holders. The light guide column, the lamp shade and the shade body are all made of light transmitting materials, and the lamp shade and the shade body may be strawberry-shaped, spherical and hemispherical.

In addition, the invention is not limited to the above implementation manners. The technical effects of the invention achieved by the almost same means shall all fall within the protection scope of the invention.

What is claimed is:

1. An LED highlight decorative bulb, comprising a lamp shade (1) capable of being mutually assembled by splicing, a light guide column (2) located in the lamp shade, a flat circuit board (3) arranged in a bottom of the light guide column, a patch LED lighting object (4) arranged in the flat circuit board, and a bulb connecting seat (5) arranged in the bottom of the light guide column, wherein an upper portion of the light guide column is in a shape of solid cone, a bottom surface of the flat circuit board is electrically connected with a conductive pin (6), the conductive pin is electrically connected with a vertical circuit board (7), the vertical circuit board is electrically connected with two electrodes in an inner wall of the bulb connecting seat through a guide line (8) respectively, and the vertical circuit board is electrically connected with an LED driver chip and a resistor element, wherein the bottom of the light guide column is equipped with a fixed ring (21), the bottom of the lamp shade is equipped with an external thread (11), an engagement portion of an upward side of the external thread and the lamp shade is equipped with a lamp shade waterproof groove (15); a waterproof rubber gasket (16) is arranged in the lamp shade waterproof groove, the bulb connecting seat is threaded with the external thread of the bottom of the lamp shade, and the fixed ring of the light guide column is clamped and tightened between the bulb connecting seat and the bottom of the lamp shade.

2. The LED highlight decorative bulb according to claim 1, wherein the bulb connecting seat is a screwed type bulb connecting seat or a bayonet type bulb connecting seat.

3. An LED highlight decorative bulb, comprising a lamp shade (1) capable of being mutually assembled by splicing, a light guide column (2) located in the lamp shade, a flat circuit board (3) arranged in a bottom of the light guide column, a patch LED lighting object (4) arranged in the flat circuit board, and a bulb connecting seat (5) arranged in the bottom of the light guide column, wherein an upper portion of the light guide column is in a shape of solid cone, a bottom surface of the flat circuit board is electrically connected with a conductive pin (6), the conductive pin is electrically connected with a vertical circuit board (7), the vertical circuit board is electrically connected with two electrodes in an inner wall of the bulb connecting seat through a guide line (8) respectively, and the vertical circuit board is electrically connected with an LED driver chip and a resistor element, wherein the bottom of the light guide column is equipped with an external thread connecting seat (22), the external thread connecting seat is equipped with an adhesion fixed station (12) for connecting with the lamp shade, an engagement portion of the external thread connecting seat and the adhesion fixed station is equipped with a fixed station waterproof groove (17), the fixed station waterproof groove is internally equipped with a waterproof rubber ring (16), the lamp shade is fixedly connected with the adhesion fixed station through mucilage glue, and the external thread connecting seat is threaded with the bulb connecting seat.

4. The LED highlight decorative bulb according to claim 3, wherein the flat circuit board is arranged in a flat circuit board fixed ring (31), and the flat circuit board fixed ring is clamped, tightened and fixed at an inner side of the bottom of the light guide column or an inner side of the bulb connecting seat.

5. The LED highlight decorative bulb according to claim 3, wherein the adhesion fixed station is a hollow hemispherical station (13), the lamp shade is a shade body (14) matched with the hollow hemispherical station, and the shade body is fixedly connected with the hollow hemispherical station through the mucilage glue.

6. The LED highlight decorative bulb according to claim 3, wherein the bulb connecting seat is a screwed type bulb connecting seat or a bayonet type bulb connecting seat.

* * * * *